June 6, 1939.  F. L. ORR  2,161,776
SYSTEM AND MEANS FOR CONTROLLING LIQUID LEVELS IN STORAGE BATTERIES
Filed Jan. 13, 1936
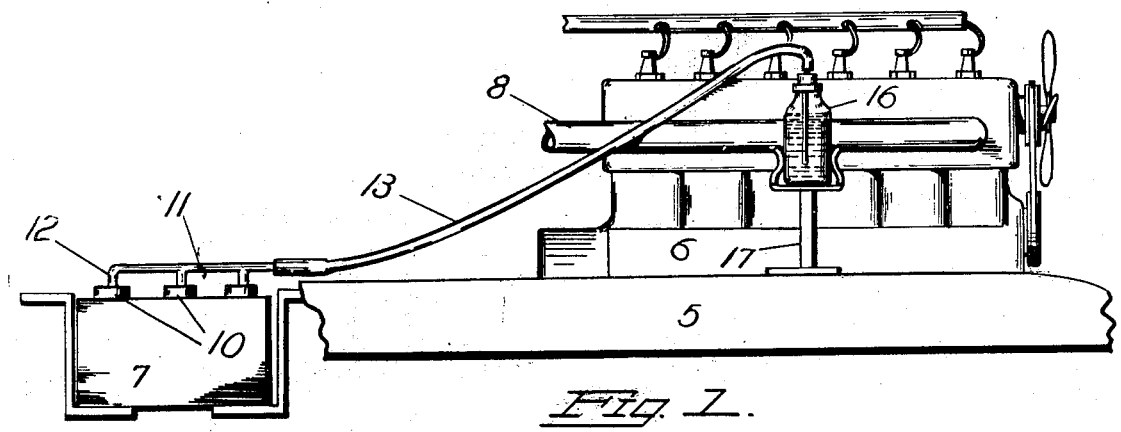
Fig. 1.
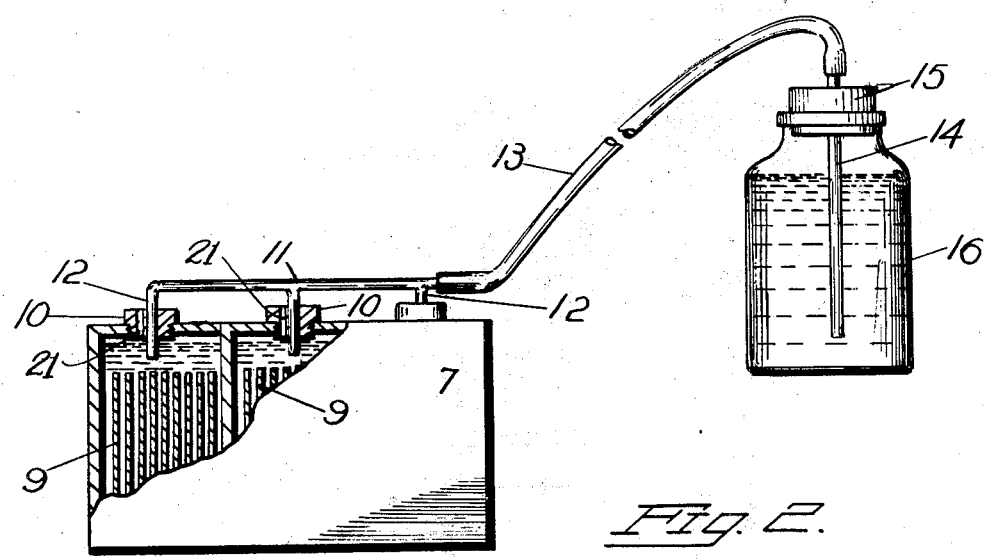
Fig. 2.
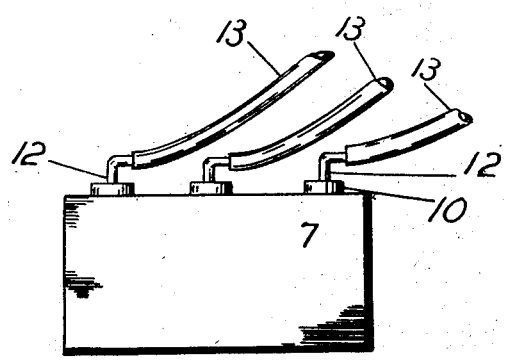
Fig. 4.
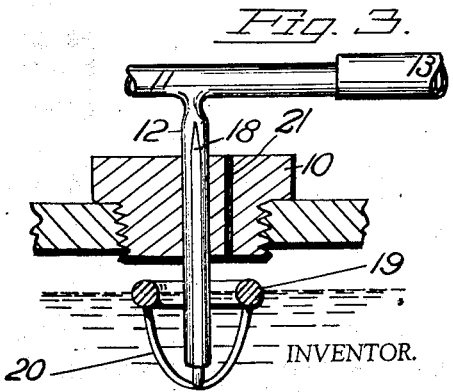
Fig. 3.
INVENTOR.
FRANCIS L. ORR
BY
ATTORNEY.

Patented June 6, 1939

2,161,776

UNITED STATES PATENT OFFICE 2,161,776

SYSTEM AND MEANS FOR CONTROLLING LIQUID LEVELS IN STORAGE BATTERIES

Francis L. Orr, Denver, Colo., assignor of one-half to Anthony E. Heichemer, Denver, Colo.

Application January 13, 1936, Serial No. 58,901

6 Claims. (Cl. 137—68)

This invention relates to a system and means for automatically maintaining a desired liquid level in a vessel, more particularly, in a storage battery.

Storage batteries are now standard equipment on practically every automobile, and are also extensively employed in small light plants of the type designed for farm use, and in many other places.

The electrolyte employed in storage batteries evaporates at a rate depending on the temperature, the rate of charge and discharge, and other factors. Unless water is added from time to time, the level of the electrolyte will soon fall to a point below the upper edges of the plates with consequent injurious results.

Automobiles are operated by many people that have no mechanical or electrical training, and under extreme conditions of load and temperature, with the result that the electrolyte evaporates at an irregular rate, and its level must be determined by periodic inspection to prevent injury to the batteries. It frequently happens, however, that the electrolyte falls too low, and that the batteries are ruined.

It is the object of this invention to produce a simple device, that can readily be attached to any automobile, for automatically controlling the electrolyte level, and which will therefore prevent injury of batteries due to the excessive fall in the electrolyte level.

Another object resides in the provision of a novel method of maintaining a substantially uniform level of the electrolyte used in storage batteries.

A further object resides in providing a novel system for automatically filling storage batteries.

The invention can be most clearly described and will be most readily understood when reference is had to the accompanying drawing in which it has been illustrated, and in which:

Figure 1 is a view showing, in side elevation, an internal combustion engine and a storage battery supported by a frame, and shows the electrolyte level maintaining device in place;

Figure 2 is a side elevation of a storage battery, partly in section, and a side elevation of the electrolyte level maintaining device connected therewith;

Figure 3 is a section through the top of one cell of the battery and illustrates a slight modification; and Figure 4 is a side elevation of a storage battery showing each cell provided with a separate level maintaining device.

In the drawing, reference numeral 5 designates the chassis of an automobile, 6 an internal combustion engine, and 7 a three cell storage battery. The engine may be of any usual construction and is provided with an exhaust manifold 8.

The battery is a multi-cell one of the usual construction, and is provided with plates 9. Each cell has been shown as provided with a removable screw plug 10 which has a central or axial opening and is also provided with a small vent opening of conventional type, as indicated at 21 (Figure 3). A tube 11, which may be made of glass, hard rubber, or of any other suitable material, preferably an electrical insulator, has been shown as extending over the top of the battery. Branch tubes 12 extend laterally from the tube 11, and are so spaced that they will project through the openings in the plugs 10. The lower ends of tubes 12 terminate at the point which represents the level at which the electrolyte should be maintained.

The open end of tube 11 is connected by means of a flexible tube 13 with the upper end of a tube 14 that extends through the cork 15 into a water bottle or reservoir 16 and terminates near the bottom of the latter. Tube 14 must have an air tight fit with the cork 15 and the latter must make an air tight seal with the bottle. The bottle is partly filled with water, as shown in Figure 2.

In Figure 1 a support 17 has been indicated, for holding the bottle adjacent the exhaust manifold. The bottle need not be in actual contact with the manifold, but must be positioned close enough to be materially affected by heat from the engine.

Let us now assume that the parts are assembled as shown and described; that the bottle is partly filled with water, and that the level of the electrolyte in the several cells of the battery is substantially at the level of the lower ends of the tubes 12. When the engine is operated the bottle and contents will become heated, with the result that the air at the top of the bottle will expand and force water upwardly through the tube 14 and into the tube 13. If the lower ends of tubes 12 are below the level of the water in the bottle, a slight syphon action will result and the pressure of the air in the bottle will be slightly less than atmospheric, but this does not affect the subsequent operation. After the pressure within the bottle has been equalized with the hydrostatic conditions prevailing, any increase in the temperature of the air will force water to flow from the bottle into the cells, and conversely, when the water and air in the bottle cools, the pressure within the bottle will tend to decrease, thereby producing a flow of liquid from the cells to the bottle. The limit of the return flow is reached when the level of the electrolyte in any cell arrives at a point below the end of the corresponding tube 12. The result of this operation is that whenever the engine is operated, a small amount of water will be transferred from the bottle to the cells, and when the engine is stopped and the parts cool, the excess electrolyte is withdrawn from the cells and it is therefore evident that as long as a proper amount of water is kept in the bottle, the electrolyte in the cells will never fall to a point below the ends of tubes 12.

As long as the level of the electrolyte in all of the cells is above the lower ends of tubes 12, the tubes 11 and 12 will serve to maintain the levels in the several cells the same, by a syphon action, and therefore, even if one cell evaporates at a faster rate than the others, the electrolyte level will be kept the same in all of the cells.

The bottle 16 can be placed above or below the level of the electrolyte desired in the cells without altering the operation.

When the battery is employed in connection with an internal combustion engine, the latter is the logical source of heat, but if the battery is charged by a wind driven generator, for example, the bottle must be subjected to some other variable heat source to effect a periodic change of temperature of the bottle and its contents, which is essential for proper operation.

In Figures 1 and 2 the electrolyte of the several cells are electrically connected by the electrolyte in tubes 11 and 12, but as such paths merely form shunts to the low resistance connectors from the opposed poles of adjacent cells, the current flow is exceedingly small. If for any reason the interconnection of the several cells by the means employed in Figures 1 and 2 should prove to be objectionable, a separate liquid level maintaining device can be employed for each cell in the manner indicated in Figure 4.

With the arrangement illustrated in Figure 2, the liquid from the bottle is divided among the several cells inversely, as the resistance to the flow of liquid to the cells, and if the tubes 12 were all the same size, it is evident that a larger amount of liquid would be delivered to the cell at the right than to the cell at the left. In order to prevent the level of liquid in any cell from rising above a predetermined level, each tube 12 may be provided with a float valve in the manner illustrated in Figure 3. In this embodiment a stem 18, which may be made of any light material that is unaffected by the acid electrolyte, such as wood or rubber, projects upwardly into each tube 12, and has its upper end tapered.

A float 19 surrounds the tube 12, and is connected with the lower end of stem 18 by some suitable means such as that indicated by numeral 20.

When the level of the liquid electrolyte in a cell reaches a predetermined point, the float 19 moves the tapered point of the stem into the restricted upper end of the tube 12 and retards the flow of liquid into that cell with the result that a greater proportion will flow to the other cells, and in this way the feed to the different cells will be equalized.

It is not necessary for the stem 18 to form a tight seal with tube 12, as it is sufficient if it restricts the flow to such an extent that a proportionally greater amount will flow to the other cells. Since the stem 18 does not form a tight seal it permits excess electrolyte to return to the bottle when the contents thereof cool.

The invention has been described in connection with a storage battery because it will find its greatest use there. This invention can be employed in other places where a variation in temperature can be used for maintaining a constant liquid level in a vessel or for supplying a limited quantity of water to any apparatus by the action produced by temperature changes.

Since the object attained by heating and cooling the water bottle and contents is to change the temperature, volume and pressure of the air, the water does not have to be changed in temperature, and the air chamber may be so shaped that the bulk of the air is in an enlargement or chamber connected with the top of the bottle by a tube.

It will be understood that if desired, the entire system of tubing, 11, 12, 13 and 14 may be of unitary construction, in any material which will be satisfactory for this purpose. The provision of the vent openings 21 in caps 10 permits escape of gases generated in the several cells of the battery.

It will be understood that when the device is installed in automobiles in the manner herein described, each time the engine is operated, sufficient heat will be transmitted to the container 16 to expand the air therein, with the result that the electrolyte level in the battery is always maintained above the plates 9. Periodic filling of the container is required, of course, and being in a position where it is readily observed in the normal servicing of an automobile, cannot be overlooked as easily as a concealed battery.

Changes and modifications may be availed of within the spirit and scope of the invention as defined in the hereunto appended claims.

What I claim and desire to secure by Letters Patent is:

1. The combination with an internal combustion engine, in operative association with a multi-cell storage battery, of a sealed container for air and water disposed adjacent the engine in a position to be influenced by heat emitted from the engine, and a conduit terminating in the container near its bottom and extending through its top into the cells of the battery and terminating at the desired liquid level therein, there being a vent admitting air to each of said cells above the liquid level therein.

2. The combination with an internal combustion engine, in operative association with a multi-cell storage battery, of a sealed container for air and water disposed adjacent the engine in a position to be influenced by heat emitted from the engine, a conduit terminating in the container near its bottom and extending through its top into the cells of the battery and terminating at the desired liquid level therein, and float-operated means in each cell for decreasing the capacity of the conduit within each cell as the level of the electrolyte in the cell rises, there being a vent admitting air to each of said cells above the liquid level therein.

3. Mechanism for supplying liquid to a vessel in which such liquid is periodically consumed, comprising a sealed container for air and water, a conduit, one end of which extends through the top of said container and terminates in proximity to its bottom, the other end of the conduit extending into such vessel and terminating at a predetermined liquid level therein, a heating element disposed adjacent the container for subjecting its contents to limited temperature variations, there being a vent in the vessel above its liquid level for admitting air thereto, and a float-actuated valve in the conduit at its entrance into the vessel for controlling the admission of liquid thereto.

4. The combination with an internal combustion engine, in operative association with a storage battery, of a sealed container for air and water disposed adjacent the engine to be influenced by heat emitted from the engine, and a conduit terminating near the bottom of the container and extending through its top into a cell of the battery to a desired liquid level therein, there being a vent in the battery above such liquid level for admitting air to the cell.

5. The combination with an internal combustion engine, in operative association with a storage battery, of a sealed container for air and water located adjacent the engine in a position to receive limited heating therefrom, and a conduit terminating near the bottom of the container and extending through its top into a cell of the battery to a desired liquid level therein, there being a vent in the battery above said liquid level for admitting air to the cell.

6. The combination with an internal combustion engine, in operative association with a multi-cell storage battery, of a sealed container for air and water disposed adjacent the engine in a position to receive limited heating therefrom, and a conduit terminating in the container near its bottom and extending through its top into the cells of the battery to a desired liquid level therein, there being vents in the battery above such liquid level for admitting air to each of said cells.

FRANCIS L. ORR.